Aug. 19, 1924.
C. F. BURGESON
ELECTRIC CONTROL SYSTEM
Filed July 19, 1923
1,505,583
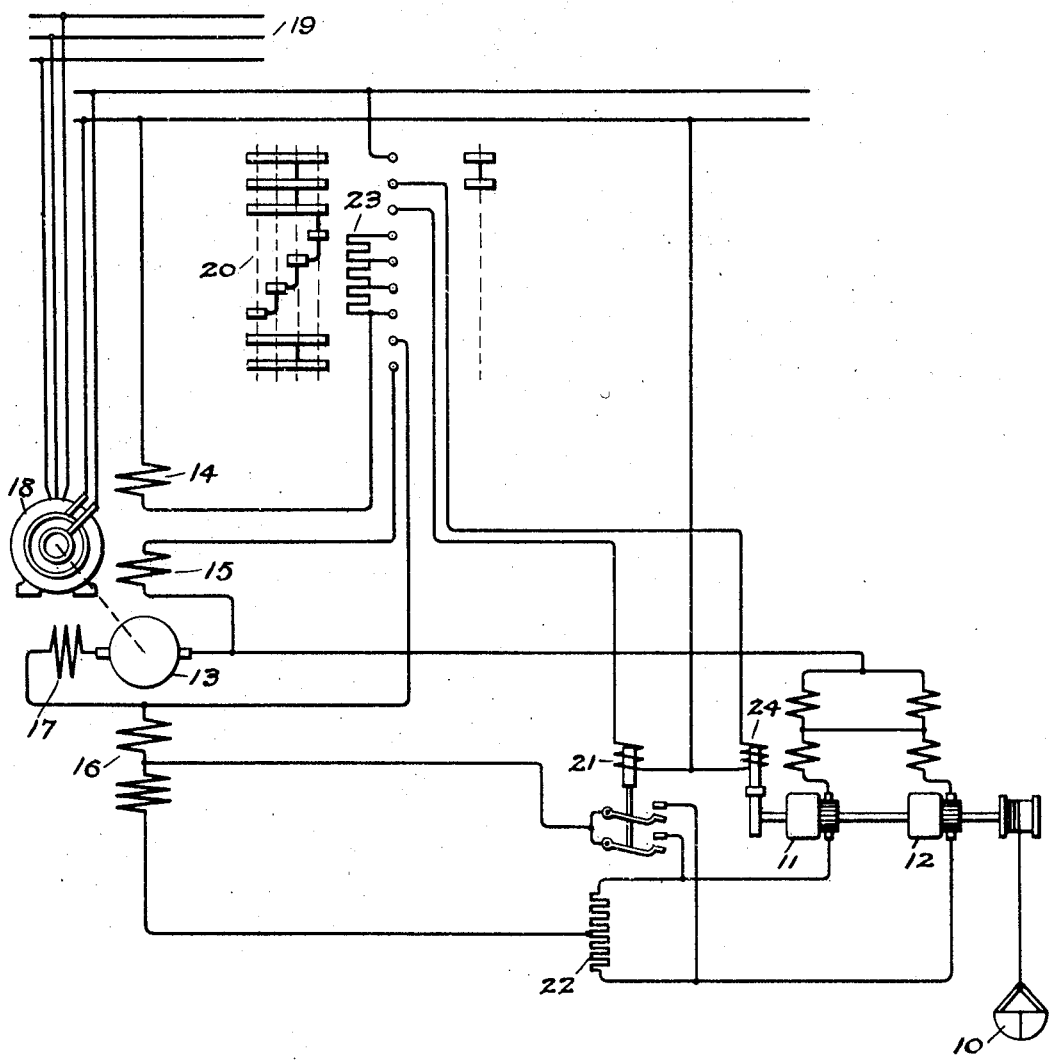
Inventor:
Charles F. Burgeson:
by
His Attorney.

Patented Aug. 19, 1924.

1,505,583

UNITED STATES PATENT OFFICE.

CHARLES F. BURGESON, OF MINNEAPOLIS, MINNESOTA, ASSIGNOR TO GENERAL ELECTRIC COMPANY, A CORPORATION OF NEW YORK.

ELECTRIC CONTROL SYSTEM.

Application filed July 19, 1923. Serial No. 652,529.

*To all whom it may concern:*

Be it known that I, CHARLES F. BURGESON, a citizen of the United States, residing at Minneapolis, county of Hennepin, State of Minnesota, have invented certain new and useful Improvements in Electric Control Systems, of which the following is a specification.

My invention relates to improvements in electric control systems, and particularly to electric control systems in which for one direction of motor operation the control of the speed is obtained by varying a separately excited field of a generator, and for the other direction of operation the generator operates as a series motor, being driven by the motor which acts as a generator during the operation in this other direction.

Although the invention is particularly applicable to electric shovel control systems, hoists, and the like, it is not necessarily limited thereto. A form of electric shovel control system well known to those skilled in the art, comprises a generator having a shunt and a separately excited field which are differentially wound with respect to a series field, the generator being driven by a motor energized from a source of supply. The generator energizes a motor or motors, which are preferably of the series type, and these motors are connected to operate the shovel dipper. The arrangement is ordinarily such that the dipper motor or motors are energized to hoist the dipper and the dipper is allowed to fall by gravity, thus driving the dipper motor or motors, causing these motors to operate as series generators, and effecting a return of power to the supply circuit. The shunt and the separately excited fields of the generator are deenergized for lowering so that the generator operates as a series motor, and the speed of lowering is thus automatically governed. If the series field of this machine is properly designed for generator operation, the excitation will not be great enough when the generator becomes a motor during lowering and the voltage of the machine will be so small in value that the speed of lowering will be too slow for the most efficient operation.

One of the objects of the invention is to provide an arrangement whereby the generator series field is controlled in such a manner that the excitation supplied by this field will be the most effective for both directions of operation of the shovel dipper.

In carrying my invention into effect in one form, I provide a sufficient number of turns on the generator series field to insure a sufficiently high speed for lowering the shovel dipper and then shunt a portion of the turns of the series field to obtain a proper excitation for raising the dipper.

A controller which governs the operation of the equipment by controlling the shunt and separately excited generator fields also controls switch mechanism for shunting a portion of the series field for raising the dipper. I find it preferable to use at least two series motors for operating the shovel dipper, the motors being connected in multiple with a resistor interposed in the multiple connection, with one terminal of the generator series field connected to an intermediate point of the resistor. The resistor thus acts to stabilize the dipper motors when they operate as generators during lowering. The switch mechanism for shunting the portion of the generator series field also operates to short circuit the said resistor during the operation of raising the dipper.

For a better understanding of the invention, reference is had to the accompanying drawing in which I have illustrated the invention in very simplified diagram. Referring to the drawing, the shovel dipper 10 is operated by the electric motors 11 and 12 which are preferably of the series type and are connected in multiple as shown. The generator 13 is connected to supply the motors 11 and 12 for operating the dipper in the hoisting direction. This generator is provided with a separately excited field 14, a shunt field 15, a series field 16, and a commutating field 17. The synchronous motor 18 is connected to drive the generator 13, and this synchronous motor receives its energy from a supply circuit 19. The controller 20 is provided for controlling the shunt and separately excited fields of the generator and also for the purpose of controlling the electromagnet switch 21 which is provided for shunting a portion of the generator series field 16 and for shunting the resistor 22 included in the multiple connection of the motors 11 and 12. The arrangement in general is such that during hoisting the control of the speed is obtained by the manipulation of the controller 20 which varies the resistor 23 included in the circuit of the separately excited field 14 and for lowering the separately excited field 14 and the shunt field 15 are deenergized so that the excitation of the machine 13, which now operates as a motor receiving energy from the motors 11 and 12 now operating as generators, is supplied by the series field 16.

The operation of the invention as thus constructed and arranged is briefly as follows: In order to cause the dipper 10 to be raised, the controller 20 is thrown to the right, thereby energizing the separately excited field 14 and the shunt field 15. The generator 13 will then supply energy to the motors 11 and 12 in such a direction that the dipper will be raised. The electromagnet switch 21 will be energized to close and thus shunt a portion of the generator series field 16 and at the same time short-circuit the resistor 22 included in the multiple connection between the motors 11 and 12. The electromagnet brake 24 will be energized to release in a well understood manner. The operation of the portion of the series field 16 which remains included in the generator circuit will now be sufficient to obtain an automatic regulation of the speed of the motors for any particular setting of the controller 20. In order to vary the speed of hoisting, the controller 20 will be operated to vary the resistor 23 in a well understood manner.

If it is desired to lower the dipper 10, the controller 20 will be thrown to the left so that the separately excited field 14 and the shunt field 15 are deenergized and the electromagnet brake 24 is energized to release. The dipper 10 will start to fall and drive the motors 11 and 12 as series generators. It will be observed that the electromagnet switch 21 is now deenergized and the shunt about the portion of the series field 16 is open and the resistor 22 is included in the multiple connection between the armatures 11 and 12. The hoisting motors 11 and 12 now operating as generators will cause the generator 13 to operate as a motor, thus driving the synchronous motor 18 as a generator to return power to the supply circuit 19. Because of the fact that the entire series field 16 is included in the circuit of the machine 13, the counter-electromotive force generated by this machine will be of a sufficiently high value so that the voltage required to be generated by the machines 11 and 12 will be of such a value that the dipper will be permitted to lower at a comparatively high speed. The one terminal of the series field 16 is connected to an intermediate point of the equalizing resistor 22 and the point at which this connection is made may be adjusted so that during lowering the machines 11 and 12 will properly distribute the load between them. If the separately excited field 14 and the shunt field 15 were not deenergized during lowering, the series field 16 would act cumulatively with respect to the fields 14 and 15 and the effect of the series field in obtaining the automatic regulation desired would be comparatively small. It is for that reason that the fields 14 and 15 are deenergized during lowering and the excitation of the machine 13 obtained entirely by the series field 16. Furthermore, if the fields 14 and 15 are maintained energized during lowering, the machines 11 and 12 will be operated as motors tending to drive the dipper 10 in the down direction and the machines 11 and 12 would not operate as generators until a comparatively high speed had been reached after the load had become "overhauling".

With my arrangement, the series field 16 may be designed so as to obtain the best regulation of the dipper speed for hoisting, since only a portion of this field will be effective during hoisting, and during lowering the entire field is made effective and the excitation will be sufficiently great to cause the voltage of the machine 13 to be sufficiently high to thereby permit a high voltage of the machines 11 and 12 and thus a high operating speed during lowering.

In accordance with the provisions of the patent statutes, I have described the principle of operation of my invention, together with the apparatus which I now consider to represent the best embodiment thereof, but I desire to have it understood that the apparatus shown is only illustrative, and that the invention may be carried out by other means.

What I claim as new and desire to secure by Letters Patent of the United States is:

1. A control system comprising a dynamo electric machine having a series field and operable either as a generator or as a motor, a second dynamo electric machine having its armature connected in circuit with the first mentioned machine to operate either as a motor receiving energy from the first machine or as a generator for driving the first machine as a motor, a controller, and connections whereby said controller causes the effective number of turns of the series field of the first machine to be reduced when the second machine operates as a motor driven from the first machine.

2. A control system for electric shovels and the like, comprising a generator having a series field, a motor connected to be energized from the said generator, a controller, and connections whereby a portion of the said series field is shunted when the controller is operated to cause the motor to run in the hoisting direction and the shunt about the said portion of the generator series field is opened for lowering.

3. A control system for electric shovels and the like, comprising a generator having a separately excited field and a series field, a motor connected to be energized from the said generator, a controller for controlling the said generator fields, electromagnetic switch mechanism for shunting a portion of the generator series field, and connections whereby the said controller regulates the generator separately excited field and energizes the said switch mechanism for hoisting only.

4. A control system for electric shovels and the like, comprising a generator having differentially wound series and separately excited fields, a pair of multiple connected series motors connected to a common load and energized from the said generator, a resistor in the multiple connection between the said motors, a connection between one terminal of the generator series field and an intermediate point of the said resistor, an electromagnetic switch, a controller, and connections whereby operating the said controller in the direction for hoisting energizes the separately excited generator field and energizes the said switch to short circuit the said resistor and shunt a portion of the generator series field, and the separately excited generator field and the said switch are deenergized when the controller is moved in the direction for lowering.

In witness whereof I have hereunto set my hand this 16th day of July, 1923.

CHARLES F. BURGESON.